United States Patent [19]

Jeppsson

[11] Patent Number: 4,613,800
[45] Date of Patent: Sep. 23, 1986

[54] SERVO SYSTEM FOR MEASURING AND CONTROLLING THE AMOUNT OF TORQUE BEING APPLIED TO ROTATING TOOLS AND METHOD

[75] Inventor: Jan Jeppsson, Bellevue, Wash.

[73] Assignee: The Boeing Company, Seattle, Wash.

[21] Appl. No.: 653,520

[22] Filed: Sep. 21, 1984

[51] Int. Cl.[4] .................. H02K 17/32; H02P 7/00
[52] U.S. Cl. .................. 318/434; 318/488; 318/646; 73/12
[58] Field of Search ............ 318/434, 432, 488, 430, 318/646, 650, 632; 173/12

[56] References Cited

U.S. PATENT DOCUMENTS

| | | | |
|---|---|---|---|
| 1,859,814 | 5/1932 | Wyckoff . | |
| 1,904,765 | 4/1933 | Hawk . | |
| 2,535,782 | 12/1950 | Carlson | 153/82 |
| 2,725,918 | 12/1955 | Deshler | 153/82 |
| 2,783,421 | 2/1957 | Hering | 318/632 X |
| 3,013,600 | 12/1961 | Baker et al. | 153/82 |
| 3,494,430 | 2/1970 | Lehmann et al. | 173/12 |
| 3,693,726 | 9/1972 | Hornig et al. | 173/12 |
| 3,926,264 | 12/1975 | Bardwell et al. | 173/12 |
| 3,939,920 | 2/1976 | Hardiman et al. | 173/1 |
| 3,973,434 | 8/1976 | Smith | 73/139 |
| 3,975,954 | 8/1976 | Barnich | 73/139 |
| 3,986,090 | 10/1976 | Hecker | 318/488 |
| 4,104,778 | 8/1978 | Vliet | 29/407 |
| 4,104,779 | 8/1978 | Sigmund | 29/407 |
| 4,106,176 | 8/1978 | Rice et al. | 29/407 |
| 4,106,570 | 8/1978 | Eshghy et al. | 173/12 |
| 4,126,818 | 11/1978 | Taylor | 318/46 |
| 4,156,162 | 5/1979 | Warfield | 318/434 |
| 4,198,737 | 4/1980 | Eshghy | 29/240 |
| 4,316,512 | 2/1982 | Kibblewhite | 173/12 |
| 4,336,718 | 6/1982 | Washburn | 318/632 X |
| 4,338,556 | 7/1982 | Hetzel | 318/434 X |
| 4,418,765 | 12/1983 | Mori et al. | 173/12 |
| 4,463,293 | 7/1984 | Hornung | 318/434 X |
| 4,510,424 | 4/1985 | Poniwa | 318/434 X |

FOREIGN PATENT DOCUMENTS

377949 of 0000 U.S.S.R. .................. 318/488

*Primary Examiner*—William M. Shoop, Jr.
*Assistant Examiner*—Patrick C. Keane
*Attorney, Agent, or Firm*—Eugene O. Heberer

[57] ABSTRACT

A power torque servo system (100) for roller swaging (122), including a servomotor (132) having a gear box (134) with a drive shaft (138). The motor is supported on two members (150, 152) on opposite sides of the drive shaft (138) and a third member (146) on which the motor may pivot. Strain gages (154, 156, 158, 160) are mounted on the members (150, 152) to measure servo-drive reaction torque in the shaft when the shaft is rotated by the motor to function as a swage drive or in another torquing operation. There are switches (236) to set a final torque value to be obtained in the servo system and an electrical servo system for receiving the strain gage measurement signals to provide a smooth low speed approach to a final torque value (182) in the shaft (138) and to eliminate any dynamic torque overshoot in the shaft.

31 Claims, 6 Drawing Figures

SERVO SYSTEM FOR MEASURING AND CONTROLLING THE AMOUNT OF TORQUE BEING APPLIED TO ROTATING TOOLS AND METHOD

TECHNICAL FIELD

The invention relates to measuring and controlling the application of torque in rotating tools and particularly, in a roller swaging power torque servo system.

BACKGROUND ART

Tube swaging, for example, where a collar is swaged into the end of a tube, requires a mandrel in a roller swage tool to be rotated until a predetermined torque is obtained. For such swaging, the required accuracy is 5% over torque ranges from 190 to 2300 inch pounds and 10% in ranges from 6 to 190 inch pounds.

Prior methods used to perform this type of swaging are indicated in the following:

In manual operation, an operator uses torque wrenches having various ranges depending upon tube sizes. This method is too time consuming to be practical.

Air motors have been used to drive a mandrel until the motor stalls. The air pressure is preset to a value corresponding to a desired stall torque. This method is inaccurate because friction losses in the motor affect the final output torque. For the ranges indicated above, several sizes of air motors are required to limit inaccuracies to a sufficiently low level and this type of operation requires several interruptions for changes of motors.

Electrical drill motors have been used to provide the power and the current to the motor is sensed and compared to a preset value. As the torque increases, the current will increase and an electronic circuit breaks the power to the motor when the preset value is reached. One problem with this system is that current is not an accurate measure of motor torque because of friction losses, and another problem is that when a motor is turned off, it continues to coast because of the energy stored in the rotating inertia of its rotor. Two sizes of drill motors are required to keep the errors reasonably small for the above torque ranges, but the system could not be made to meet the tolerance requirements.

Hydraulic systems have been tried but they suffer from the same type of errors as pneumatic systems.

A search of the patent literature has disclosed the following patents of interest.

U.S. Pat. No. 2,535,782 to Carlson discloses a power driven roller tube expander, a mandrel revolution counter driven by a power device, and means adapted to be actuated as a result of an increase in the power, the revolution counter being arranged to stop rotation of the mandrel when a predetermined number of subsequent revolutions has been counted.

U.S. Pat. No. 3,494,430 to Lehmann et al discloses means for measuring reactive torque on a casing during rotation of a driven element therein, whereby a motor in the casing is reversed and shut off by control means responsive to reactive torque on the casing.

U.S. Pat. No. 4,106,570 to Eshghy et al describes an air-power tool including a motor, a gear reducer and a driver in which the motor turns at a higher rate than the driver. An angle sensor is arranged to determine rotation of the motor rather than of the driver. Means are provided to compensate for the rotation sensing as a function of applied torque.

U.S. Pat. No. 4,126,818 to Taylor discloses a method for driving an output shaft through a steplike angular displacement in which a command signal is used to energize a stepper-type primary motor connected to drive an output shaft so as to develop reaction torque by means of the stepper-type primary motor, transducing the reaction torque into a control signal and using the signal to energize a secondary motor which is connected in driving relation to the output shaft, thereby energizing the secondary motor when reaction torque is present to augment torque produced by the stepper-type primary motor to drive the output shaft.

The following patents of general interest were also found:

U.S. Pat. No. 1,859,814: R. D. Wyckoff
U.S. Pat. No. 1,904,765: W. L. Hawk
U.S. Pat. No. 2,725,918: W. B. Deshler
U.S. Pat. No. 3,013,600: R. E. Baker et al.
U.S. Pat. No. 3,693,726: Hornig et al.
U.S. Pat. No. 3,926,264: Bardwell et al.
U.S. Pat. No. 3,939,920: Hardiman et al.
U.S. Pat. No. 3,973,434: S. K. Smith
U.S. Pat. No. 3,975,954: R. G. Barnich
U.S. Pat. No. 4,104,778: W. C. Vliet
U.S. Pat. No. 4,104,779: J. A. Sigmund
U.S. Pat. No. 4,106,176: Rice et al.
U.S. Pat. No. 4,126,818: W. W. Taylor
U.S. Pat. No. 4,198,737: S. Eshghy
U.S. Pat. No. 4,418,765: Mori et al.
Russian Pat. No. 377,949

DISCLOSURE OF THE INVENTION

The invention is a power torque servo system and method for roller swaging and other torquing applications. The invention includes a servomotor and reduction gear box having a drive shaft extending therefrom, the motor being supported on two members on opposite sides of the shaft output portion and on a third member on which the motor may pivot. Strain gages are mounted on the two members on the output side of the gear box to measure servodrive reaction torque in the shaft when the shaft output portion is rotated by the motor to function as a swage or other torque drive. There are means to set a final torque value in the servo system and there is an electrical servo system, for receiving the strain gage measurement signals, to provide a smooth, low speed approach to the final set torque value in the shaft and to eliminate any torque overshoot in the shaft.

The electrical servo system is formed as a closed loop with the strain gage signals and there is a tachometer in the servomotor to provide feedback to the motor to control its speed, the means to set a final torque value being connected to provide an input command to the servoloop. The system has two loops, one being an inner tachometer rate loop and a second loop being an outer torque loop having a first summing amplifier by which measured torque on the output shaft is subtracted from the set torque. The inner loop is closed through a second summing amplifier connected to the first summing amplifier.

A strain gage transducer amplifier in the outer loop provides a signal in which the torque component is proportionate to the motor acceleration and deceleration, the torque component being compensated in a third summing amplifier. There are means by which the tachometer rate signal is differentiated and added with an amount of polarity so that the acceleration/deceleration component in the resulting torque signal from the third summing amplifier is zero.

The servo system includes a rate offset resistor having its own voltage supply and being connected to the second summing amplifier to increase voltage and shaft speed so as to reduce swaging or other torquing time to a short period and to eliminate a theoretically infinitely long period to reach the final set torque value and completion of swaging. There are means in the outer loop to provide a zero level signal to indicate when the measured torque is equal to the set torque and there are means to open the outer loop when the measured torque is equal to the set torque and to feed a reversing signal into the second summing amplifier to reverse the shaft to disengage a swaging tool from a workpiece.

There is a set torque current source to provide current to the first summing amplifier and to the second summing amplifier for starting the motor. The tachometer is connected to the inner loop to feed the feedback signal to the second summing amplifier to control the speed of the motor.

There is level sensing and mode control connected at a point between the first and second summing amplifiers for sensing the voltage to indicate that the set torque has been obtained and that the motor should be reversed to disengage the swaging tool from the workpiece. The mode control means stops the motor and sets it in a reverse mode for a short period. There are also means to set the system in a hold mode when the motor is in the reverse mode at which time a digital readout of the maximum torque obtained is frozen.

The inaccuracy problems of the prior art are eliminated, according to the invention, by having the torque measured by simple, inexpensive strain gages. The only friction error in this sensing arrangement is caused by the friction in the third member on which the motor may pivot. The third member is a pin supported on a ball bearing which supports the servodrive in a rear end, the strain gages being on supports at a forward end adjacent the drive shaft of the motor. As indicated, the strain gages also sense the torque caused by motor acceleration and deceleration; however, deceleration is very low at the time the final torque value is reached. In addition, this torque contribution is compensated electronically.

A high performance electrical DC servo system is used to provide the smooth, low speed approach to the final torque value, so as to eliminate a dynamic overshoot problem. One servodrive can handle the total torque range between six and twenty-three hundred inch pounds, so as to eliminate the need for changing motors in current systems. In one prior art system presently used six air motors or two electrical motors are required.

Further advantages of the invention may be brought out in the following part of the specification wherein small details have been described for the competence of the disclosure, without intending to limit the scope of the invention which is set forth in the appended claims.

BRIEF DESCRIPTION OF THE DRAWING

Referring to the accompanying drawings which are for illustrative purposes.

BEST MODE FOR CARRYING OUT THE INVENTION

Figure 1:
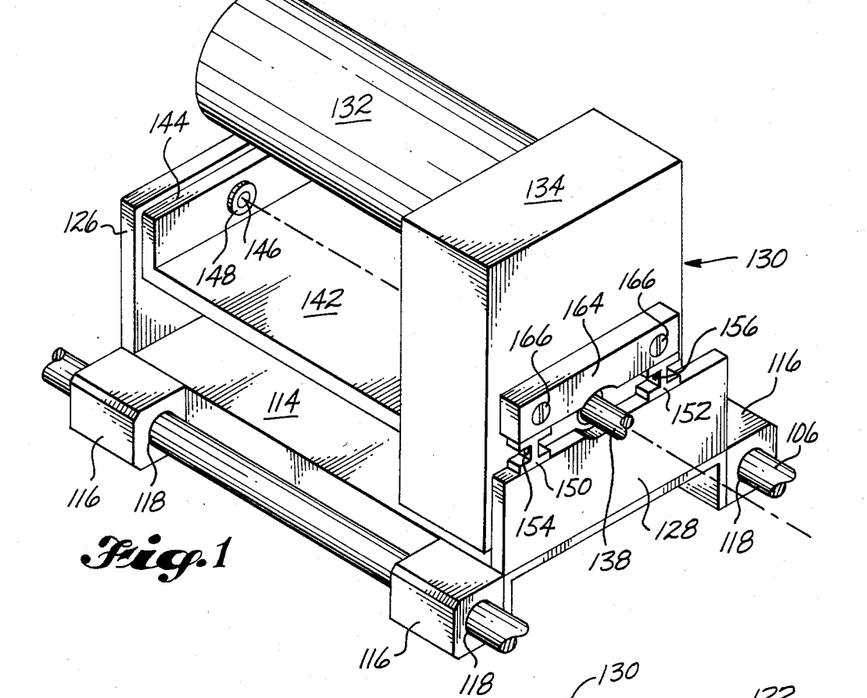
FIG. 1 is a fragmentary pictorial view of the mechanical elements of a servodrive torque application system according to the invention.
Figure 2:
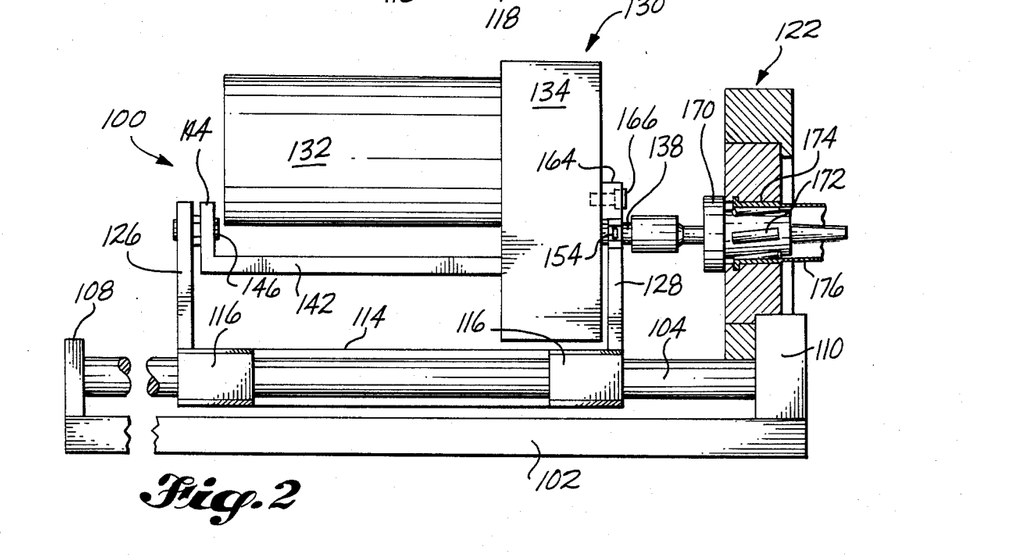
FIG. 2 is a side elevational view of the structure shown in FIG. 1 with swaging elements added.

Referring again to the drawings, in FIGS. 1 and 2, there is shown a power torque servo system for roller swaging, generally designated as 100, supported on a table plate 102. Secured to the plate 102 are horizontal support rods 104 and 106, having their ends secured in end plates 108 and 110 extending upwardly from the table plate 102.

The servo system has a base plate 114 and from each of its ends, there extend lateral support members 116 having cylindrical openings 118 therethrough. The support members 116 are fitted on the two rods 104 and 106 and are adapted to slide thereon to move the servo system to and from the swage components, generally designated as 122.

End plates 126 and 128 extend upwardly from the ends of plate 114 and are secured thereto. A servodrive, generally designated 103, is comprised of a DC servomotor 132 having a built-in tachometer and secured to a 17.5:1 reduction gear box 134. Extending outwardly from the reduction gear box on the output side is a drive shaft 138, out of line with the motor.

A bracket 142 is secured at one end to the reduction gear box 134 and has its end plate 144 pivotally secured to the plate 126 by a shoulder bolt 146, the plate 144 being mounted for pivotal rotation on the bolt 146 by means of a ball bearing 148. The shoulder bolt 146 is aligned with the drive shaft 138.

Plate 128 supports two I-shaped support members 150 and 152, positioned on opposite sides of the drive shaft 138. Each of the vertical members of the I-shaped members have two vertically positioned strain gages, FIG. 3, 154, 156, 158, and 160. At the upper ends of the I-members 150 and 152 is a horizontal plate 164 secured to the gear box 134 by screws 166. Thus, the servodrive is supported at three points, 146, 150 and 152 to the base plate 114.

As shown in FIG. 2 the drive or output shaft portion 138 is connected to a swaging tool 170 having roller expanders 172 therein for swaging a collar 174 into a tube 176. During the swaging operation, which is by way of example, torque is applied by the rotation of the output shaft 138 and the collar 174 is swaged to fit tightly and securely within the tube 176.

Figure 3:
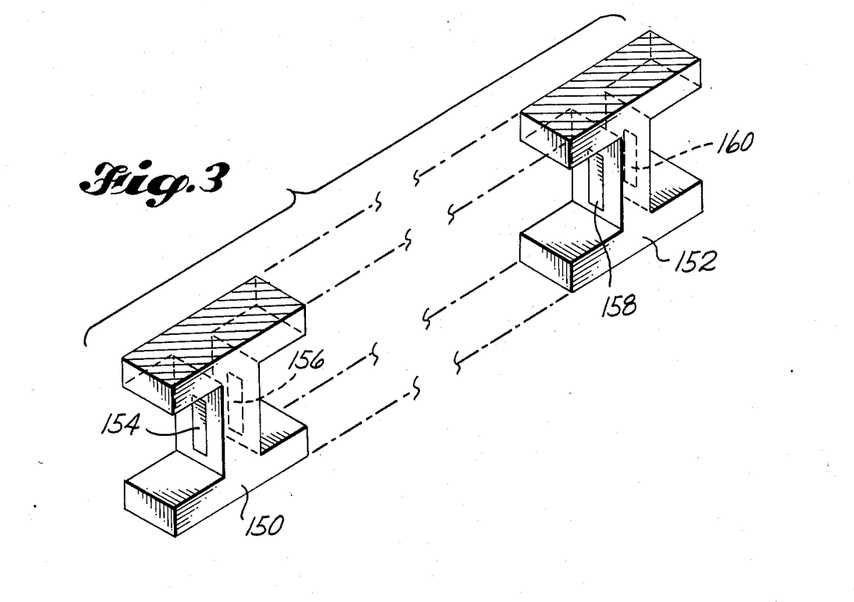
FIG. 3 is an enlarged fragmentary view illustrating the strain gage mounting arrangement on support members on opposite sides of the servodrive shaft.

During the torquing operation, the differential strain in the two strain gage support members 150 and 152 and on the strain gages 154, 156, 158, and 160 represents the torque in the output shaft plus negligible friction torque in the ball bearing 148. A static torque, because of the off-center weight of the drive 138 relative the motor 132, is also sensed, as is a torque caused by motor acceleration and deceleration. Both of these torque contributions are compensated by electronic means to be described.

For the system shown the maximum required torque of twenty-three hundred inch pounds on the output shaft requires a motor current of 34.2 amperes with the 17.5:1 ratio of the gear box.

Figure 4:
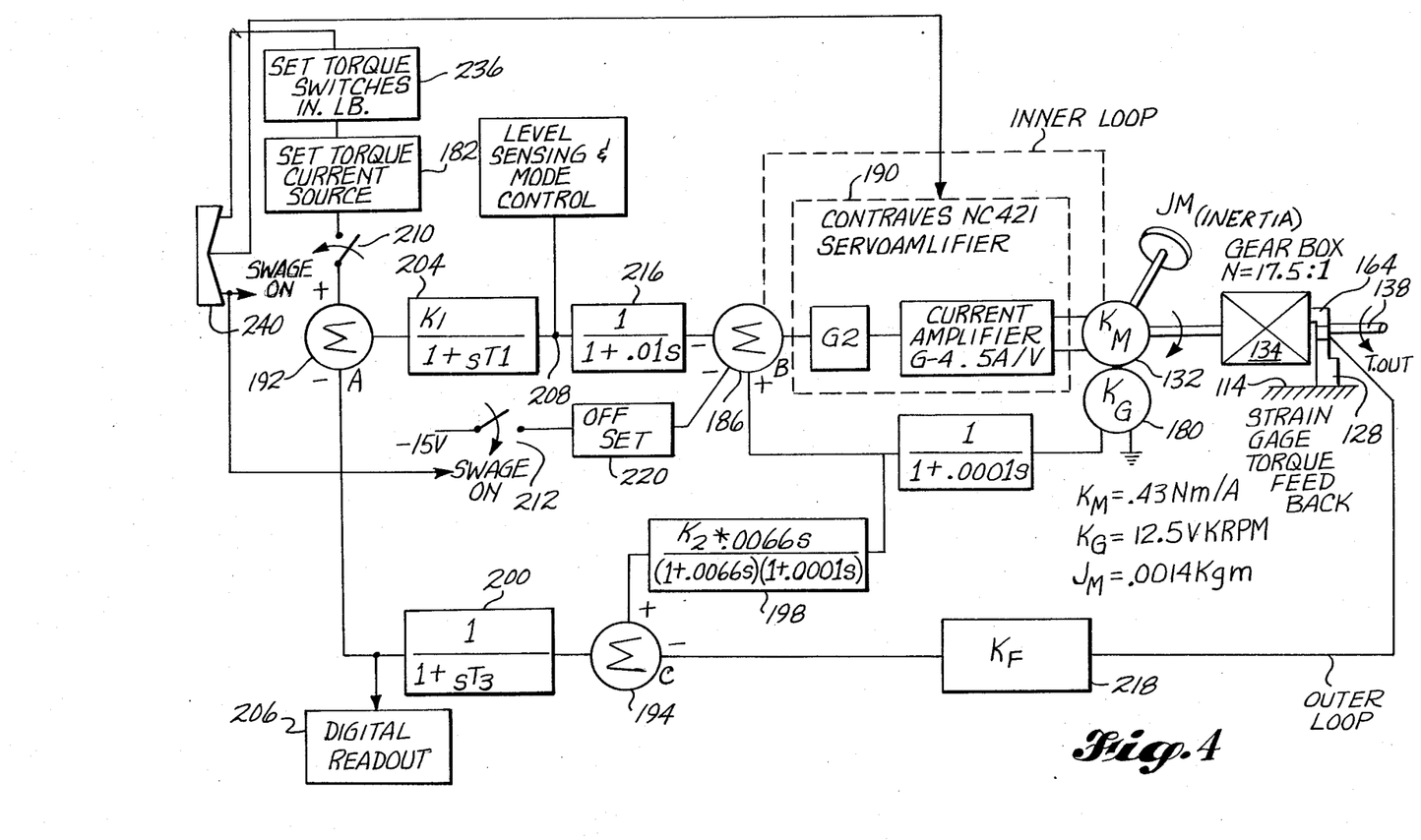
FIG. 4 is a block diagram of servoloops for the servo system.

The system has a closed loop, FIG. 4, with a strain gage signal and DC tachometer 180 in the servomotor as feedback. A set torque 182 is an input command to the servoloop. The block diagram, FIG. 4, illustrates the system with definitions of the system constants.

Figure 6:
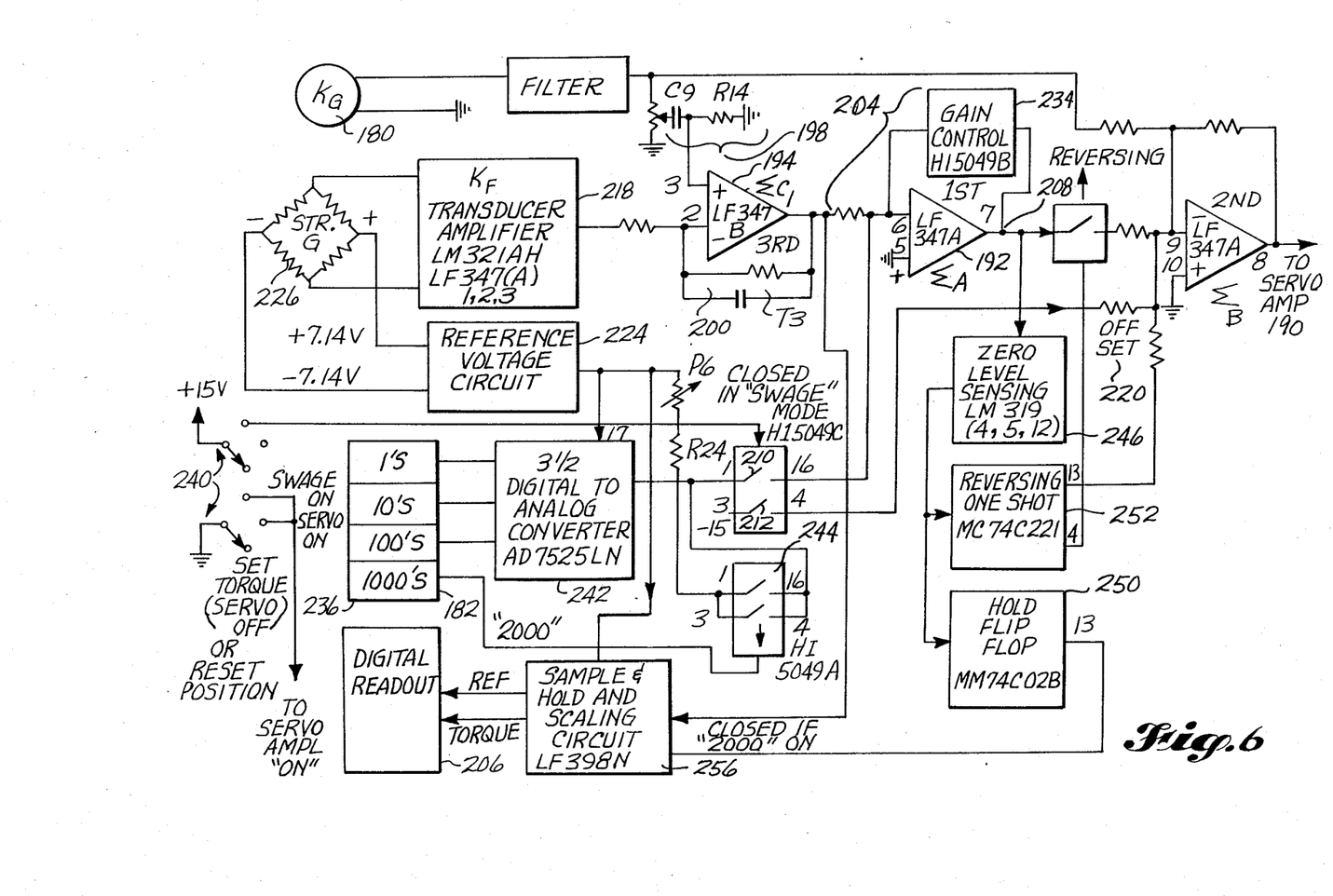
FIG. 6 is an electronic control circuit block diagram for the servo system.

The system has two loops, an inner tachometer rate loop, closed through summation point B or second summing amplifier 186, (FIG. 6, amplifier LF347A, pins 9, 10, 8). Transfer function G2, relationship between input and output, of the servo amplifier 190 is as shown in FIG. 4. The inner rate servoloop has a response time of approximately two milliseconds for a small-step input command.

The outer torque loop has summation point A 192 or first summing amplifier (amplifier LF347A, pins 5, 6, 7, FIG. 6) in which the measured torque on the output shaft 138 is substracted from the torque input command as indicated in 182. The torque component in the strain gage transducer signal, proportionate to the motor acceleration and deceleration, is compensated in summation point C or third summing amplifier 194 (amplifier LF347B, pins 1, 2, 3). Differentiator 198 (C9 R14) differentiates the tachometer rate signal and adds to it an amount of polarity so that the acceleration/deceleration component in the resulting torque signal from the summation point C or amplifier 194 is zero. The signal is then passed through filter 200 with a lag time constant of $T_3$ being equal to 0.005 second. The "s" as used in FIG. 4 is the Laplace operator.

The gain $K_1$ and lag time constant $T_1$, following the summation point A is made dependent of the range of set torque as shown in Table I below.

TABLE 1

GAIN $K_1$ AND TIME CONSTANTS AT DIFFERENT SET TORQUE RANGES

| SET TORQUE RANGE IN-LB | $K_1$ — | $T_1$ SEC | DYNAMIC ERROR $T_1 + T_3$ IN-LB/(IN-LB/SEC) |
|---|---|---|---|
| 99 | 320 | 0.109 | 0.115 |
| 100-799 | 51 | 0.017 | 0.023 |
| 800-2300 | 8.7 | 0.003 | 0.008 |

The reason for variable gain is to compensate for the large variation in torque/shaft angle ratio as occurs when swaging small tubes (low ratio) and large tubes (high ratio). Potential for system instability would otherwise exist when swaging large tubes if the highest gain were selected for all sizes. Too slow approach to the final torque value would be the case when swaging small tubes if the lowest gain was used for all sizes.

A zero level in signal at point 208, after amplifier and filter 204, is used to indicate when the measured torque, as shown in the digital readout 206, is equal to the set torque, at which time the switches "swaged on" 210 and 212 open, and a reversing, positive signal is fed into summing point 186 for approximately two seconds. A lag filter 216 with a ten millisecond time constant is required after amplifier 204 before the signal is fed into the second summing point 186 as a rate input command into the inner rate loop.

The system gain in the outer loop depends upon the torque-to-shaft rotation ratio of the swager. This is not constant for various tube sizes and not constant during the swaging of one tube. This ratio $K_T$, the characteristic of the tube, equals inch pound/revolution. A strain gage transducer amplifier $K_F$ 218 is adjusted to a sensitivity of 235 in-lb/V = $1/K_F$.

Figure 5:
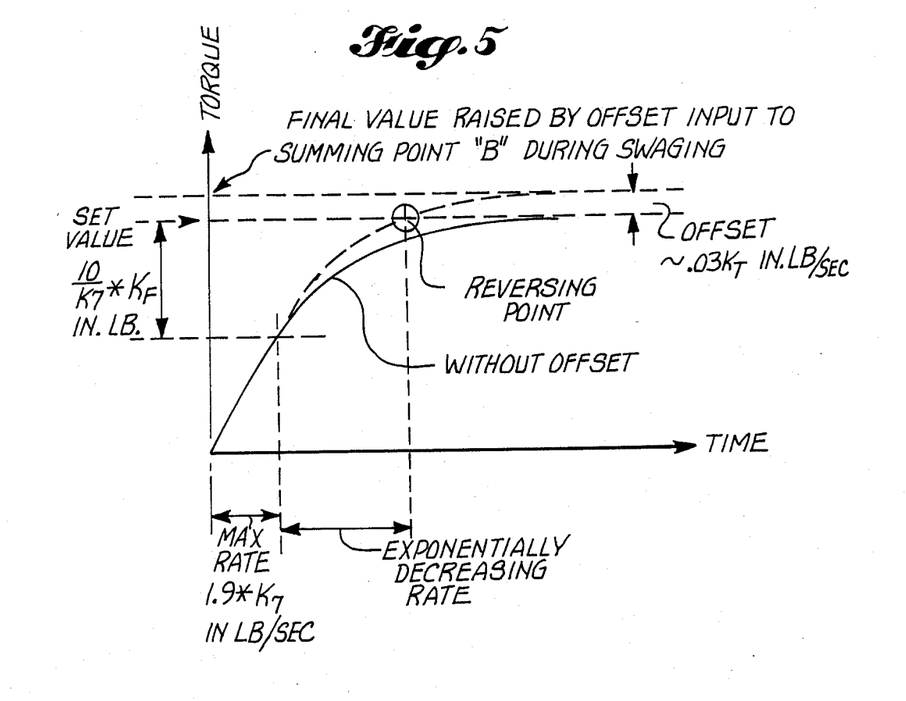
FIG. 5 is a graph illustrating torque build-up during swaging.

The output from amplifier 204 is limited to 10 V corresponding to $10/K_1$ V on the input, that is $2350/K_1$ in-lb of torque. If the differential between set torque and measured torque is larger than this value, the system will run at maximum speed before exponentially slowing down to zero. It takes a theoretically infinitely long time to reach the final set value. A small offset rate 220 is therefore fed into the summing point 186 during the "swage on" mode, that is, when the torque is being applied, so as to reduce the swaging time to a few seconds. The deceleration at the time of shut-off is still sufficiently low so as not to cause errors when the compensation is properly adjusted. The deceleration torque is insignificant except for the lowest set torque values down to six in-lbs. In FIG. 5 it is shown how the torque builds up during swaging, assuming $K_T$ is constant, that is, that the load acts like a torque spring. The offset 220 is set at 0.15 V so as to cause the torque to reach its final value at a rate=to $0.015 \times 1.9 \times K_T$ approximately equivalent to $0.03 \times K_T$ in-lb/sec.

Referring to FIG. 6, an analog reference system or reference voltage circuit 224 generates a bipolar voltage of approximately $\pm 7.14$ V amplitude which is applied to a strain gage bridge 226. Both voltages are proportionate to the $-15$ V supply voltage and may vary slightly. The $+7.14$ V is used as reference for the set torque current source, FIG. 4, as well as for the digital readout 206, and is proportionate to the $-7.14$ V. The accuracy of the ratio between the set torque and measured and displayed torque from the strain gages is therefore independent of power supply voltage variation and transducer resistance variation.

A strain gage transducer amplifier 218 (LM321AH) followed by an operational amplifier (LF347A, sections 1, 2, 3) connect to the strain gage bridge. The amplifier has a very low temperature drift, typically 0.2 uV/°C. Full-scale (2350 in-lbs) output from the transducer is in the order of 25 mV which means the temperature drift is typically $0.002/25 \times 2350$ in-lb/°C.=0.02 in-lb/°C. The operator control for balancing the transducer should therefore not be required to be used once the system is set up for operation.

A resulting torque signal is fed to the first summing amplifier 192 amplifier 204, and lag filter 216 in FIG. 4. The gain is changed by analog switches, gain control, (HI5049B) 234 controlled by the condition of a set torque thumb wheel switch 236.

A 3½-digital to analog converter (AD7525LN) 242 provides a current proportionate to the reference voltage (pin 17) 224 and the setting of the switches 236. The converter 242 has a range up to 1999 in-lbs but because one tube size used in the swaging operation requires a torque above this amount, an analog switch (HI5049A, sections 1, 16 and 3, 4), 244, controlled by a bit "2000" of the switch 236 is used with a resistor R24 and a potentiometer P6 to provide current equivalent to 2000 in-lbs.

The set torque current is fed to the summing amplifier 192 when the analog switch 210 is closed. This happens when the operator depresses a control switch 240 to "swage on" position. The section 3, 4 of switch 212 feeds the torque offset value to the second summing amplifier 186, where the tachometer rate signal and the torque error signal are also added.

When the torque error reaches zero level, the output from a comparator (Zero Level Sensing LM319, section 4, 5, 12), 246 goes low, triggering a hold flip flop (MM74C02B) 250 to go low on pin 13. The system will remain in hold mode until the operator depresses the control switch to the reset position. The setting of the hold flip flop triggers a reversing one shot (MC74C221) 252, so that its output pin 13 goes high for two seconds. This causes a reverse motion of the output shaft 138 so that a swage mandrel on the shaft loosens in the tool.

A reference voltage to the comparator 246 is held positive during reset mode and is driven to zero a certain delay time after the system is set in "swage on" mode. This delay is necessary because it takes a short time for the torque error signal to go negative after the torque mode is initiated.

The signal to the display is fed from the torque signal amplifier or third summing amplifier 194, pin 1 via a sample and hold circuit (LF398N) 256. When the system is not in hold mode, the digital readout will show the actual measured torque. During hold mode, the torque value at the time of mode change will be shown.

The three position switch 240 has two sections as shown in FIG. 6. In the "set torque" position the servo amplifier is off, but the torque command can be set. In the middle position the servo amplifier is on and the motor may drift slowly but in this middle position the operator can take the shaft and move it to enable engagement of the swaging tool 170 to the coupling on the drive shaft 138. In the third position, it connects the switches 210 and 212; that is the "swage on" position and torque is generated by a tool engaged in the workpiece.

In operation, when the switch 240 is in the "swage on" position, current is sent into the first summing amplifier 192, through the amplifier 204 and into the second summing amplifier 186 which causes the motor to start turning.

As soon as the motor starts turning, the tachometer 180 feeds back a feedback signal to summing amplifier 186 which controls the speed of the motor. As a swaging tool or torquing tool starts to tighten up in the workpiece, torque value is picked up in the strain gages and the signal passes through the amplifier 218 to the third summing amplifier 194. Signal at the summing amplifier 194 is added to the acceleration signal from the differentiator 198. Normally the acceleration is small and it can be ignored for most tube sizes except the smallest. When the feedback torque value passes through the summing amplifier 194 back to the summing amplifier 192, it has a negative current opposite the entering current. Thus, as the torque continues to increase the difference between the set torque current and the feedback current decreases and the motor starts going slower and slower. During this period there is a continual digital readout of the torque. The voltage is sensed at the point 208 when this voltage is zero, the set torque value has been obtained and it is the time to start reversing the shaft in the workpiece.

At that time the swaging stops and the reversing starts, the mode control circuit sets the system in reverse mode. This continues for about two seconds and as the system is set in reverse mode it also is set in hold which means that the digital readout is frozen at the maximum torque.

The feeding of a small offset 220 voltage into the summing amplifier 186 provides a certain velocity in the motor at the time the zero voltage develops at point 208. Without the offset, the motor would proceed very slowly and would theoretically continue for an infinitely long time to come up to the correct torque value. With the offset the velocity is increased somewhat and the torque feedback is identical with the set torque when the voltage becomes zero so as to shut off and complete the operation.

When the operation is completed, the operator sets the switch 240 in reset position and the workpiece is removed.

The invention and its attendant advantages will be understood from the foregoing description and it will be apparent that various changes may be made in the form, construction, and arrangements of the parts of the invention without departing from the spirit and scope thereof or sacrificing its material advantages, the arrangements hereinbefore described being merely by way of example. I do not wish to be restricted to the specific forms shown or uses mentioned except as defined in the accompanying claims.

What is claimed is:

1. A method of obtaining a set torque value in a rotating tool driven by a servomotor, comprising:
   mounting a servomotor and reduction gear box, having a rotatable drive shaft output portion for a torquing tool, on two support members on opposite sides of the drive shaft output portion; said shaft output portion extending from the gear box toward the torquing tool;
   securing strain gages to the two support members on the output side of the gear box and measuring servodrive reaction torque in the shaft output portion with the strain gages when the shaft is rotated to apply torque to a workpiece;
   setting a final torque value, by an input command to an electrical servo system, to be applied by a tool on the shaft;
   receiving signals from the strain gages in the electrical servo system; and
   providing, by means of the electrical servo system, a slowing of the servomotor as the torque increases and a smooth, low speed approach to the set final torque value in the shaft.

2. The method according to claim 1 including: preventing any dynamic torque overshoot in the shaft.

3. The method according to claim 1 including: providing signals from the strain gages through a closed servoloop and a tachometer in the servomotor to feedback to the motor to control its speed;
   the electrical servo system having two loops, one being an inner tachometer rate loop, and the second loop being an outer torque loop;
   subtracting measured torque on the output shaft from the set torque with a first summing amplifier in the outer loop; and
   closing the inner loop through a second summing amplifier connected to the first summing amplifier.

4. The method according to claim 3 including:
   providing a strain gage signal, having a torque component proportionate to the motor acceleration and deceleration, to a strain gage transducer amplifier in the outer loop;
   compensating the torque component in a third summing amplifier in the outer loop; and
   differentiating the tachometer rate signal and adding an amount of polarity to it so that the acceleration/deceleration component in the resulting torque signal from the third summing amplifier is zero.

5. The method according to claim 3 including:
providing additional voltage to the second summing amplifier to increase voltage in the electrical servo system to increase the shaft speed so as to reduce torquing time to a short period and to eliminate to theoretically infinitely long period to reach the final set torque value and completion of the torquing operation.

6. The method according to claim 3 including:
providing in the outer loop a zero level in the feedback signal to indicate when the measured torque is equal to the set torque; and
opening the outer loop when the measured torque is equal to the set torque and feeding a reversing signal into the second summing amplifier to reverse the shaft to disengage a torquing tool from a workpiece.

7. The method according to claim 3 including:
providing a set torque current to the first summing amplifier and to the second summing amplifier to start driving the servomotor; and
feeding the feedback signal from the tachometer to the second summing amplifier to control the speed of the motor.

8. The method according to claim 3 including:
passing the feedback torque value signal on the strain gages through a transducer amplifier in the outer loop and to a third summing amplifier;
using the tachometer velocity signal to generate a value of acceleration through a differentiator between the tachometer and the third summing amplifier;
filtering a negative signal current from the third summing amplifier to the first summing amplifier;
whereby as the applied torque increases the difference between the set torque current and the feedback current decreases, and the motor speed decreases slowly.

9. The method according to claim 3 including:
compensating the set torque current by a feedback current in the first summing amplifier;
an amplifier filter being between the first and second summing amplifiers;
triggering voltage from the amplifier filter at a point in the outer loop between the amplifier filter and the second summing amplifier;
sensing the voltage at said point to determine that the set torque has been obtained, and that the motor should be reversed to disengage the torquing tool from the workpiece.

10. The method according to claim 9 including:
stopping the motor when the set torque has been obtained by mode control means at said point and setting the motor in a reverse mode for a short period.

11. The method according to claim 10 including:
setting the servo system and the electrical motor in a hold mode when the motor is set in the reverse mode; and
freezing a digital readout of the maximum torque obtained when the system is in the hold mode.

12. The method according to claim 11 including:
operating a three position switch externally of the servo system;
in a first servo amplifier off position or reset position;
in a second position supplying enabling current to the servomotor, and
in a third position for applying torque with a tool on the drive shaft.

13. A power torque servo system for roller swaging or other processes requiring torque, comprising:
a servomotor having a gear box with a drive shaft output portion extending therefrom and connected thereto;
the motor being supported on two members on opposite sides of the shaft output portion;
strain gages mounted on the two members to measure servodrive reaction torque in the shaft output portion when the shaft is rotated by the motor to function as a torque drive; said strain gages being adjacent the shaft output portion and on the output side of the gear box;
an electrical servo system formed as a closed servo loop and having the servomotor connected therein;
the electrical servo system being connected to receive the strain gage measurement signals of the reaction torque;
means in the electrical servo system to set a final torque value for the drive shaft; and
means in the electrical servo system for receiving the strain gage signals, to slow the servomotor as the torque increases and to provide a smooth, low speed approach to the set final torque value on the shaft.

14. The invention according to claim 13 in which:
the motor is additionally supported on a third member on which the motor may pivot;
the motor being fixedly supported on the two members and the two members being spaced from the third member a distance sufficient to permit the motor to pivot on the third member.

15. The invention according to claim 14 in which:
the third member is in line with the shaft.

16. The invention according to claim 13 in which:
the servomotor has a built-in rate sensing tachometer and the gear box having reduction gears to reduce the speed of the shaft relative to the motor.

17. The invention according to claim 16 in which:
the electrical servo system is formed to have the strain gage signals and tachometer in the servomotor to provide feedback to the motor to control its speed; and
said means to set a final torque value being connected to provide an input command to the servoloop.

18. The invention according to claim 17 in which:
the electrical servo system has two loops, one being an inner tachometer rate loop;
the second loop being an outer torque loop having a first summing amplifier by which measured torque on the output shaft is subtracted from the set torque;
the inner loop is closed through a second summing amplifier connected to the first summing amplifier.

19. The invention according to claim 18 in which:
the electrical servo system includes a rate offset resistor connected from a constant voltage to the second summing amplifier to increase shaft speed so as to reduce torquing time to a short period and to eliminate a theoretically infinitely long period to reach the final set torque value and completion of swaging.

20. The invention according to claim 18 including:

means in the outer loop to provide a zero level signal to indicate when the measured torque is equal to the set torque; and means to open the outer loop when the measured torque is equal to the set torque and to feed a reversing signal into the second summing amplifier to reverse the shaft to disengage a torquing tool from a workpiece.

21. The invention according to claim 18 including:

a set torque current source to provide current to the first summing amplifier and the second summing amplifier to start driving the motor;

the tachometer being connected through the inner loop to provide a rate feedback signal to the second summing amplifier to control the speed of the motor.

22. The invention according to claim 21 including:

a filter between the tachometer and the second summing amplifier in the inner loop to filter the tachometer signal.

23. The invention according to claim 18 in which:

the feedback torque value signal on the strain gages passes through a transducer amplifier in the outer loop and to a third summing amplifier, there being a differentiator between the tachometer and the third summing amplifier so as to use a tachometer velocity signal to generate a value of acceleration;

a filter between the third summing amplifier and the first summing amplifier, the feedback signal coming back to the first summing amplifier in a negative current, the source current being positive, whereby as the torque increases, the difference between set torque current and the feedback current decreases, and the motor speed decreases slowly.

24. The invention according to claim 18 including:

means in the servoloop for compensating a set torque current by a feedback current with the first summing amplifier;

a filter being between the first and second summing amplifiers;

a point in the outer loop on the output of the first summing amplifier having means for voltage level sensing;

means at said point for sensing the voltage to indicate that the set torque has been obtained, and that the motor should be reversed to disengage the swaging tool from the workpiece.

25. The invention according to claim 24 including:

mode control means connected to the outer loop at said point to stop the motor and set it in a reverse mode for a short period.

26. The invention according to claim 25 including:

means to set the electrical servo system and motor in hold mode when the motor is set in reverse mode at which time a digital readout of the maximum torque obtained is frozen.

27. The invention according to claim 26 including:

external switch means having three positions, the first position is the servo amplifier off position or reset position, the second position supplies enabling current to the servomotor, and the third position is the torque on position at which torque is generated.

28. The invention according to claim 18 including:

a strain gage transducer amplifier in the outer loop for receiving a signal from the strain gages, said last signal having a torque component proportionate to the motor acceleration and deceleration;

a third summing amplifier in said outer loop for compensating for said last torque component; and a differentiator connecting the inner loop to the third summing amplifier for differentiating the tachometer rate signal and for adding to it an amount of polarity so that the last torque component in the resulting torque signal from the third summing amplifier is zero.

29. A power torque servo system for roller swaging or other processes requiring torque, comprising:

a servomotor having a gear box with a drive shaft extending therefrom and connected thereto;

the motor being fixedly supported on two members on opposite sides of the shaft and on a third member, providing pivotal low friction support;

the two members being spaced from the third member a distance sufficient to permit the motor to pivot on the third member;

strain gages mounted on the two members to measure servodrive reaction torque in the shaft when the shaft is rotated by the motor to function as a torque drive;

an electrical servo system formed as a closed servo loop and having the servomotor connected therein;

the electrical servo system being connected to receive the strain gage measurement signals of the reaction torque;

means in the electrical servo system to set a final torque value for the drive shaft;

means in the electrical servo system for receiving the strain gage signals and for providing smooth, low speed approach to the set final torque value on the shaft; and means in the electrical servo system to eliminate any dynamic torque overshoot in the shaft connected to the gear box.

30. A method of obtaining a set torque value in a rotating tool driven by a servomotor, comprising:

mounting a servomotor and gearbox having a rotatable drive shaft for a torquing tool on two support members on opposite sides of the drive shaft;

pivotally mounting the servomotor on a third pivot and support member, the third member being spaced from the two members sufficiently to permit the motor to pivot thereon;

securing strain gages to the two support members and measuring servodrive reaction torque in the shaft with the strain gages when the shaft is rotated to apply torque to a workpiece;

setting a final torque value, by an input command to an electrical servo system, to be applied by a tool on the shaft;

receiving signals from the strain gages in the electrical servo system; and providing, by means of the electrical servo system, a smooth, low speed approach to the set final torque value in the shaft.

31. The method according to claim 30 including:

aligning the shaft with the third member.

* * * * *

UNITED STATES PATENT AND TRADEMARK OFFICE
CERTIFICATE OF CORRECTION

PATENT NO. : 4,613,800

DATED : September 23, 1986

INVENTOR(S) : Jan Jeppsson

It is certified that error appears in the above-identified patent and that said Letters Patent are hereby corrected as shown below:

Column 4, line 32, "103", should be -- 130 --.

Claim 5, column 9, line 7, "to" third occurrence should be -- a --.

Signed and Sealed this

Tenth Day of March, 1987

Attest:

DONALD J. QUIGG

Attesting Officer

Commissioner of Patents and Trademarks